United States Patent
Koide et al.

(10) Patent No.: US 6,426,481 B1
(45) Date of Patent: Jul. 30, 2002

(54) METHOD FOR MANUFACTURING DISCHARGE NOZZLE OF LIQUID JET RECORDING HEAD AND METHOD FOR MANUFACTURING THE SAME HEAD

(75) Inventors: Jun Koide; Kenji Sato; Masahiko Kubota, all of Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,395

(22) Filed: Jun. 27, 2000

(30) Foreign Application Priority Data

Jun. 29, 1999 (JP) .......................... 11-182892
Jun. 29, 1999 (JP) .......................... 11-182931

(51) Int. Cl.$^7$ ............................................ B23K 26/38
(52) U.S. Cl. ............................................ 219/121.71
(58) Field of Search ........................ 219/121.7, 121.71; 347/47; 430/5

(56) References Cited

U.S. PATENT DOCUMENTS

| | | | |
|---|---|---|---|
| 4,929,256 A | | 5/1990 | Shepherd ................... 51/293 |
| 5,189,347 A | * | 2/1993 | Michaelis et al. ...... 219/121.71 |
| 5,208,980 A | | 5/1993 | Hayes ..................... 29/890.1 |
| 5,326,426 A | * | 7/1994 | Tam et al. |
| 5,657,539 A | | 8/1997 | Orikasa et al. ............ 29/890.1 |
| 5,948,290 A | * | 9/1999 | Yamamoto et al. ..... 219/121.71 |
| 6,048,652 A | * | 4/2000 | Nguyen et al. ................. 430/5 |
| 6,120,976 A | * | 9/2000 | Treadwell et al. |

FOREIGN PATENT DOCUMENTS

| | | |
|---|---|---|
| EP | 309146 | 3/1989 |
| EP | 0761448 A2 | 12/1997 |
| EP | 968824 A1 | 1/2000 |
| JP | 6510958 W | 12/1994 |
| JP | 8-132260 | 5/1996 |
| JP | 9-118017 | 5/1997 |

* cited by examiner

*Primary Examiner*—Geoffrey S. Evans
(74) *Attorney, Agent, or Firm*—Fitzpatrick, Cella, Harper & Scinto

(57) ABSTRACT

A method for manufacturing a liquid jet recording head and a method for manufacturing discharge nozzles thereof through which drops of recording liquid or the like are projected to be deposited on a printing medium. The method for manufacturing the discharge nozzles uses sublimation caused by an ultraviolet laser. In the method, a laser beam is emitted from the liquid ejection side of a discharge port forming plate, and a mask plate having a total-reflection mirror coating layer to prevent it from being damaged is used. The method allows many discharge nozzles, tapered so that they are progressively thinner toward their ends, to be formed on the liquid ejection side of the discharge port forming plate simultaneously in a short period of time.

13 Claims, 7 Drawing Sheets

METHOD FOR MANUFACTURING DISCHARGE NOZZLE OF LIQUID JET RECORDING HEAD AND METHOD FOR MANUFACTURING THE SAME HEAD

BACKGROUND OF THE INVENTION

1. Field of the Invention

The present invention relates to a method for manufacturing a discharge nozzle by which the discharge nozzle in a liquid jet recording head is manufactured by use of sublimation caused by an ultraviolet laser by splashing liquid drops of printing liquid or the like to deposit the liquid drops on a printing medium. The present invention also relates to a method for manufacturing the liquid jet recording head.

2. Related Background Art

For an ink jet printer which splashes drops of ink or the like to deposit them on a printing medium, printing quality largely depends on the characteristics of a nozzle, which ejects recording liquid. Most of these characteristics are determined by nozzle diameter variations and nozzle shape. Methods for forming a nozzle which has thus far been proposed are roughly classified into two types. Methods of one type include electroforming, which uses a metal plate, or electro-discharge, while those of the other type include a method for manufacturing (abrading) an organic macromolecular resin material using sublimation caused by a high-energy laser, such as an ultraviolet laser represented by an excimer laser. An ultraviolet laser method is generally used for fine nozzle manufacturing.

At the time of manufacturing an organic macromolecular material at a laser energy density suited to sublime the material using an ultraviolet laser method, the manufactured area becomes progressively smaller from the side of laser beam incoming to the side of laser beam outgoing, that is, a so-called tapered feature results. Because a nozzle shape required to increase the quality of printing by a liquid jet recording head is tapered to become progressively thinner toward the side of recording liquid ejection, the nozzle is manufactured by emitting a laser beam from the side of recording liquid feed, that is, after the discharge nozzle is manufactured, a plate in which the discharge nozzle is manufactured is jointed to a member which feeds recording liquid.

However, a discharge nozzle is required to be about a few micrometers to about one hundred micrometers long to ensure high printing quality. Moreover, a plate in which discharge nozzles are formed, of course, has the same thickness. A discharge nozzle forming plate is so thin and deformable that the plate must be worked using a laser from the side of liquid feed, and the plate must be jointed to a member which feeds recording liquid. Thus, the discharge nozzle forming plate deforms under stress after it is jointed to the member, so that a plurality of discharge nozzles aligned in the same direction are not formed, resulting in different directions of recording liquid ejection, which in turn deteriorate printing quality.

To solve these problems, methods have been proposed for manufacturing discharge nozzles after assembling a liquid jet recording head.

One of these methods, which is proposed in National Publication of International Patent Application No. 6-510958 (describing an invention by Compaq Computer Corporation), makes light beams, limited using mask patterns, obliquely incident on a discharge nozzle forming plate in two directions. By doing so, the discharge nozzle forming plate is worked in the direction of light beam travel, thus manufacturing discharge nozzles which are tapered so that the tapered form of the manufactured width is wider at inside than outside.

Another method, which is proposed in Japanese Patent Publication No. 6-24874 (Zahl Limited), emits a light beam, with a mask plate on which nozzle patterns are formed in close contact with a discharge nozzle forming plate in such a manner that a light beam is obliquely incident at the mask plate brought into close contact and the discharge nozzle forming plate, and swings or turns the mask plate and the discharge nozzle forming plate on a pivot, so that manufacturing progresses in the direction of light beam incidence, thus manufacturing on the liquid ejection side of the discharge nozzle forming plate discharge nozzles which are tapered so that they are progressively thinner toward their ends.

Because light beam manufacturing is performed in only two directions, the method, described in National Publication of International Patent Application No. 6-510958, forms on the liquid ejection side of a discharge nozzle forming plate in the oblique directions of light beam incidence discharge nozzles which are tapered so that they are progressively thinner toward their ends. In contrast, at right angles to the oblique directions, the method forms on the liquid ejection side discharge nozzles which are tapered so that they fan out toward their ends. Discharge nozzles which are tapered so that they fan out toward their ends are formed on the side of liquid ejection instead of cone-shaped discharge nozzles symmetric about the direction of liquid ejection, thus resisting ejected recording liquid and prolonging a liquid ejection period, so that high-speed printing becomes impossible. What is worse, nozzles fanned out manufacture mist during liquid ejection.

Because as this case does not relate to any projection imaging system, discharge nozzles must be formed one at a time. Thus it takes a long time to manufacture many discharge nozzles. This, in turn, means that the method is disadvantageous in terms of productivity. Because nozzle size sharply varies with the magnitude of light beam energy, it is difficult to keep the tolerance stable.

Because the method described in Japanese Patent Publication No. 6-24874 inclines a mask plate and a discharge nozzle forming plate to a light beam over time, it may be difficult to form tapered discharge nozzles which are symmetric about the direction of liquid ejection, depending on the states at the beginning and end of manufacturing, that is, on the process of manufacturing. As a result, it is difficult to eject recording liquid stably in the same direction from individual liquid jet recording heads.

Although all mask patterns (many arrayed discharge nozzles) can be formed at one time, manufacturing time is limited by inclination time because the method inclines a mask plate and a discharge nozzle forming plate. Thus manufacturing time increases, leading the method to be disadvantageous in terms of productivity.

To solve these problems, the applicant proposed in Japanese Patent Application No. 10-182407 a method which emits a plurality of parallel high-energy ultraviolet beams at the same time in directions at a predetermined angle to a perpendicular to a mask plate and symmetric about an axis, with the mask plate, patterned with the shape of liquid jet recording head discharge nozzles, in close contact with the external surface of a discharge nozzle forming plate, to form in the discharge nozzle forming plate a one-dimensional array of liquid jet recording head discharge nozzles or a plurality of rows of a plurality of arrays of liquid jet recording head discharge nozzles.

A discharge nozzle formed by the method is symmetric about the direction of liquid ejection. The method allows discharge nozzles which are tapered so that they are progressively thinner in part or in whole toward their ends to be formed on the liquid ejection side of the discharge nozzle forming plate. The method also allows many arrayed discharge nozzles to be formed at a time in a short time.

However, to provide a mask plate which is not worked or damaged, that is, exhibits high durability when an ultraviolet beam is emitted with the mask plate in close contact with a discharge nozzle forming plate, it is desired that the level of technology be further enhanced. When a mask plate is brought into close contact with a discharge nozzle forming plate, patterns on the mask plate must be positioned in predetermined locations on the discharge nozzle forming plate. To position patterns in predetermined locations more easily and efficiently, it is also desired that the level of technology be further enhanced.

SUMMARY OF THE INVENTION

It is an object of the present invention to provide on the one hand a method for manufacturing discharge nozzles of a liquid jet recording head allows many discharge nozzles, tapered so that they are progressively thinner toward their ends, to be formed on the liquid ejection side of a discharge nozzle forming plate at a time in a short time by emitting a laser beam from the liquid ejection side, wherein a mask plate can be prevented from being damaged and on the other hand a method for manufacturing the liquid jet recording head.

It is another object of the present invention to provide a method for manufacturing discharge nozzles of a liquid jet recording head which brings a mask plate patterned with a shape of a discharge port to be formed, into close contact with a liquid jet side of a discharge port forming plate of the liquid jet recording head and emits a laser beam from the side of the mask plate to fabricate the discharge nozzles on the discharge port forming plate, wherein the mask plate has a quartz substrate and a total-reflection mirror coating layer which is provided in the areas outside the shape of the discharge nozzles on the substrate and the substrate is disposed on the side on which the laser beam is incident.

It is still another object of the present invention to provide a method for manufacturing discharge nozzles of a liquid jet recording head which brings a mask plate patterned with a shape of a discharge port to be formed, into close contact with a liquid ejection side of a discharge port forming plate of the liquid jet recording head and emits an ultraviolet laser beam from the side of the mask plate to fabricate the discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and after the total-reflection mirror coating layer is removed according to the shape of the discharge ports, the total-reflection mirror coating layer is overcoated with an inorganic material which transmits ultraviolet rays.

It is a further object of the present invention to provide a method for manufacturing discharge nozzles of a liquid jet recording head which brings a mask plate patterned with a shape of a discharge port to be formed, into close contact with a liquid ejection side of a discharge port forming plate of the liquid jet recording head and emits an ultraviolet laser beam from the side of the mask plate to fabricate the discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and after the total-reflection mirror coating layer is overcoated according to the shape of the discharge ports, the total-reflection mirror coating layer and the overcoating layer are removed according to the shape of the discharge nozzles.

According to the present invention, damage to a mask plate can be prevented, and high tolerances are possible because a mask plate does not expand or deform due to heat.

It is a still further object of the present invention to provide on the one hand a method for manufacturing discharge nozzles of a liquid jet recording head which allows a discharge nozzle forming plate and a mask plate to be positioned with respect to each other easily and efficiently and discharge nozzle positioning accuracy to increase when a laser beam is emitted from the liquid ejection side of the discharge nozzle forming plate to form on the liquid ejection side discharge nozzles which are tapered so that they are progressively thinner toward their ends and on the other hand a method for manufacturing the liquid jet recording head.

It is another object of the present invention to provide a method for manufacturing a liquid jet recording head, which brings a mask plate, patterned with the shape of discharge ports to be formed, into close contact with the liquid ejection side of a discharge port forming plate of the liquid jet recording head and emits a laser beam from the side of the mask plate to fabricate discharge nozzles on the discharge port forming plate, wherein the mask plate has a quartz substrate and a total-reflection mirror coating layer which is provided in the areas outside the shape of the discharge ports on the substrate and wherein the substrate is disposed on the side on which the laser beam is incident.

It is another object of the present invention to provide a method for manufacturing a liquid jet recording head which brings a mask plate, patterned with the shape of discharge ports to be formed, into close contact with the liquid ejection side of a discharge port forming plate of the liquid jet recording head and emits an ultraviolet laser beam from the side of the mask plate to fabricate discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and wherein after the total-reflection mirror coating layer is removed according to the shape of the discharge ports, the total-reflection mirror coating layer is overcoated with an inorganic material which transmits ultraviolet rays.

It is another object of the present invention to provide a method for manufacturing a liquid jet recording head which brings a mask plate, patterned with the shape of discharge-ports to be formed, into close contact with the liquid ejection side of a discharge port forming plate of the liquid jet recording head and emits an ultraviolet laser beam from the side of the mask plate to fabricate discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and wherein after the total-reflection mirror coating layer is overcoated, the total-reflection mirror coating layer and the overcoating layer are removed according to the shape of the discharge ports.

The present invention allows the patterns on a mask plate which is brought into close contact with a discharge port forming plate to be easily and efficiently aligned with each other, thus significantly increasing the accuracy of positioning discharge nozzles.

The present invention also allows many discharge nozzles to be formed at a time in a short time which are symmetric about the direction of liquid ejection and tapered so that they are progressively thinner in part or in whole toward their ends and which have an opening of the same diameter on the liquid ejection side.

The present invention further allows discharge nozzles to be manufactured in the last step after liquid jet recording head assembly, thus preventing ink ejection in different directions which is caused by deformation due to assembly and coupling of a discharge nozzle forming plate. The present invention also allows discharge nozzles which are tapered so that they are progressively thinner toward their ends to be formed on the liquid ejection side of a discharge nozzle forming plate. Thus liquid drop ejection is kept in a direction, and liquid drop ejection speed increases, resulting in significantly enhanced quality of printing by a liquid jet recording head and increased printing speed.

BRIEF DESCRIPTION OF THE DRAWINGS

FIG. 1A is a front view, FIG. 1B is a side view, and FIG. 1C is a bottom view;

FIG. 4A is a top view, FIG. 4B is a front view, and FIG. 4C is a side view;

DETAILED DESCRIPTION OF THE PREFERRED EMBODIMENTS

Figure 1A:
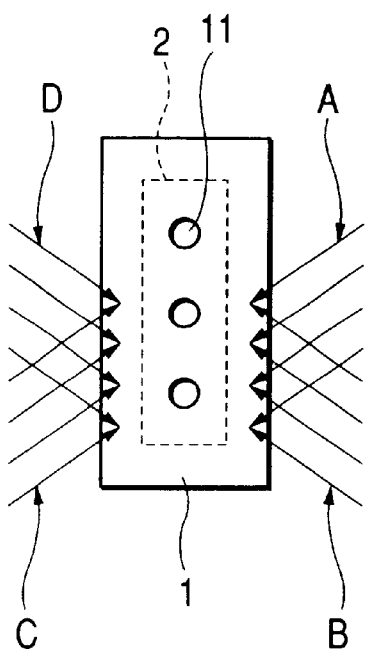
FIGS. 1A, 1B and 1C are schematic views illustrating a method for manufacturing discharge nozzles of a liquid jet recording head of the present invention.

Referring now to the drawings, embodiments of the present invention will be described below.

Figure 1B:
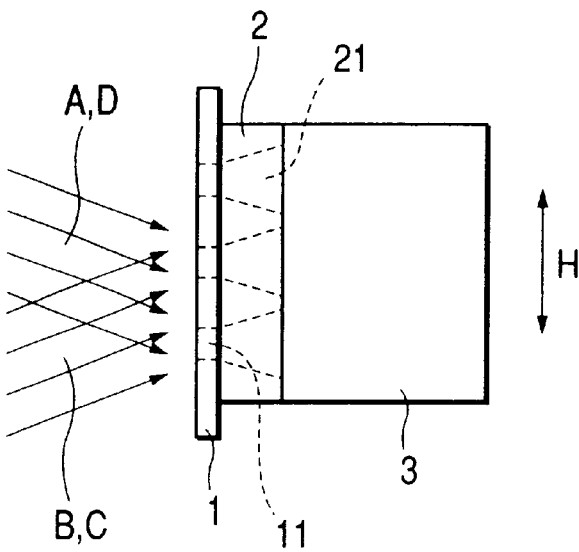
Figure 1C:
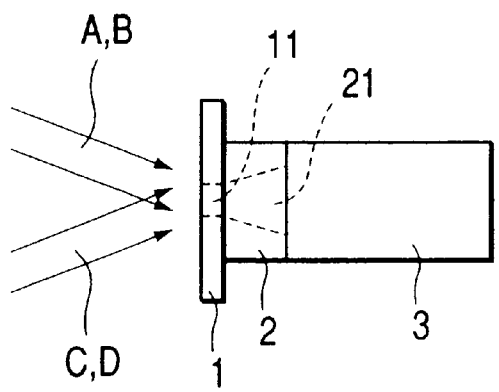

FIGS. 1A, 1B and 1C are schematic views illustrating a method for manufacturing discharge nozzles of a liquid jet recording head of the present invention. The method for manufacturing the discharge nozzles of the present invention will be described in detail below.

In FIGS. 1A, 1B and 1C, reference numeral 1 denotes a mask plate which is provided with patterns 11 corresponding to the shape of discharge ports to be formed, reference numeral 2 denotes a discharge nozzle forming plate (orifice plate) in which discharge nozzles 21 are formed, and reference numeral 3 denotes a liquid jet recording head body to which the orifice plate 2 is jointed. The discharge nozzles 21 are manufactured by directing parallel high-energy ultraviolet laser beams A, B, C, and D from the side of liquid discharge to the orifice plate 2 of the liquid jet recording head in which the orifice plate 2 is mounted on and combined with the liquid jet recording head body 3. The laser beams A, B, C, and D are inclined in different directions to a perpendicular to the mask plate 1, which is in close contact with the orifice plate 2. The laser beams A, B, C, and D are adapted so that they meet at the patterns on the mask plate 1.

Figure 2:
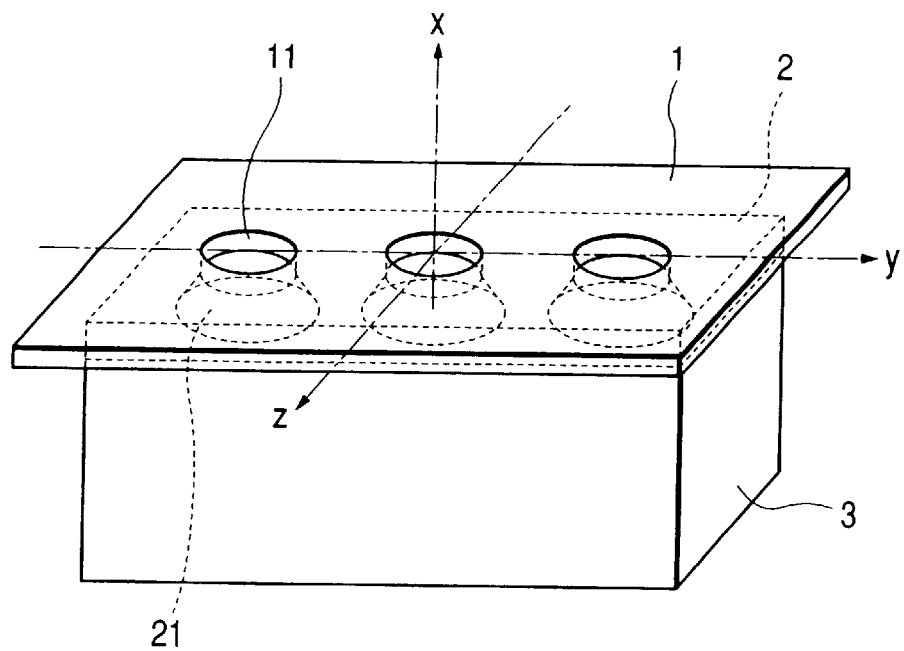
FIG. 2 is a perspective view illustrating a coordinate system for a liquid jet recording head of the present invention.
Figure 3:
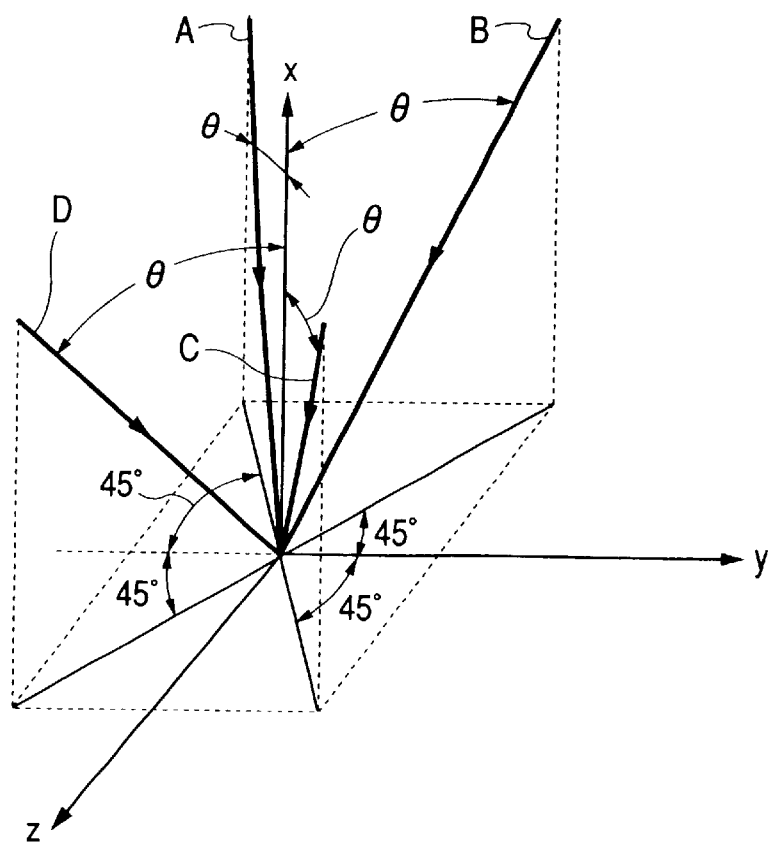
FIG. 3 illustrates directions of laser beam emission as given off by a method for manufacturing discharge nozzles of a liquid jet recording head of the present invention.

Directions in which the laser beams A, B, C, and D are directed at the mask plate 1 will be described in detail below. If an x-y-z coordinate system is established as shown in FIG. 2, the laser beams are basically directed in the directions shown in FIG. 3, that is; at the y-z plane at an angle of 45° to the y axis (the direction of an array of discharge nozzles 21), with an angle of 90° made between the beams. The laser beams are inclined an angle θ to the x axis (the direction of a perpendicular to the mask plate 1). The angle θ, which is set according to the thickness of the orifice plate 2 and laser beam energy density, ranges from about 5° to about 20°. In the embodiment, the angle θ is 15°.

When the mask plate 1 is used to fabricate discharge nozzles in the orifice plate 2, this plate, which is jointed to the liquid jet recording head body 3, and the mask plate 1, which is in close contact with the orifice plate 2, together are moved back and forth more than once in the direction of an array of formed discharge nozzles (the direction H indicated by an arrow in FIG. 1B) with respect to the area at which the ultraviolet laser beams are aimed during the period from the start to the end of the fabrication. This movement makes it possible to evenly aim the laser beams at each discharge nozzle under the same conditions by integral effects on the unevenness in irradiation distribution of the ultraviolet laser beams that are used for manufacturing the discharge nozzles, so that all discharge nozzles are manufactured into the same shape.

Below will be described the structure of a mask plate used for discharge nozzle fabrication of the present invention and its manufacturing steps. FIGS. 6A to 6C, 7A to 7D and 8A to 8C show three types of mask plate. These types will be described one after another below.

Figure 6A:
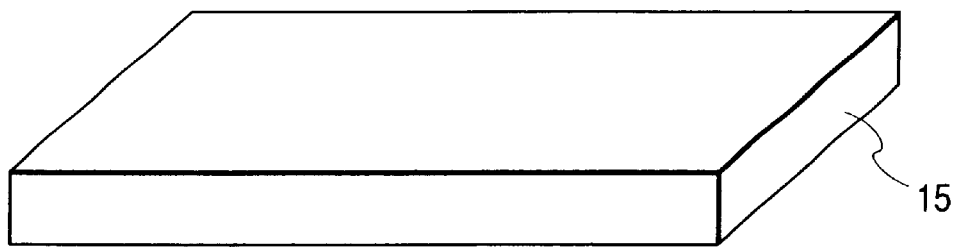
FIGS. 6A, 6B and 6C are schematic views illustrating a first process of producing a mask plate used for a method for manufacturing discharge nozzles of a liquid jet recording head of the present invention.
Figure 6B:
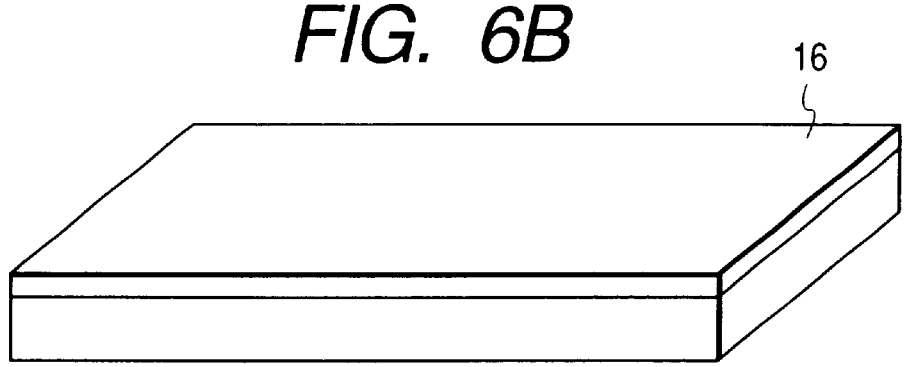
Figure 6C:
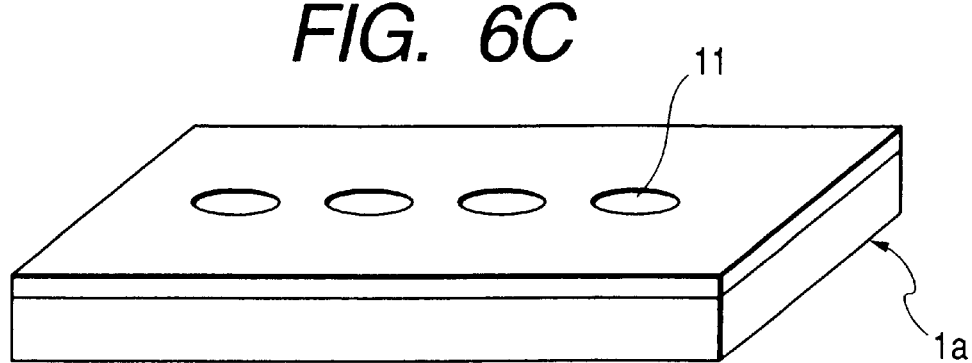

FIGS. 6A to 6C show the first type of mask plate.

As shown in FIG. 6A, a quartz substrate 15, which is obtained by cutting a synthetic quartz plate to a predetermined size, is used as the base of the mask plate 1. As shown in FIG. 6B, by deposition or sputtering, a dielectric multilayer interference film mirror coating layer 16 is formed according to the wavelength of the ultraviolet laser beams emitted during discharge nozzle fabrication in the orifice plate on the side of the quartz substrate 15 which is brought into close contact with the orifice plate when discharge nozzles are manufactured in the orifice plate (the side opposite to the side on which the ultraviolet laser beams are incident, or the upper surface in FIG. 6A). The dielectric multilayer interference coating layer is a laminate of $SiO_2$, $MgF_2$, and $CaF_2$ layers. The total-reflection mirror coating layer 16 is provided with resist patterns, not shown, etching is performed by plasma emission to remove the thickness of the total-reflection mirror coating layer 16 and form patterns 11 corresponding to the shape of the discharge ports, and the resist is removed to manufacture a mask plate 1a shown in FIG. 6C.

Figure 7A:
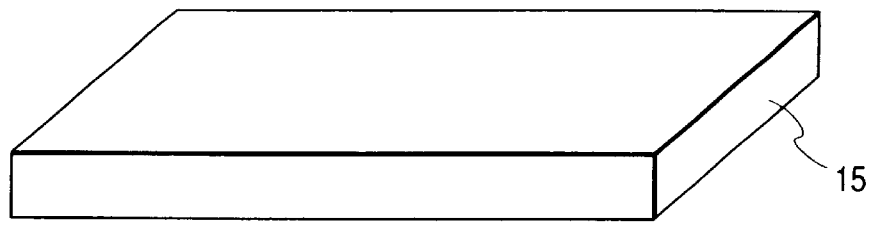
FIGS. 7A, 7B, 7C and 7D are schematic views illustrating a second process of producing a mask plate used for a method for manufacturing discharge nozzles of a liquid jet recording head of the present invention.
Figure 7B:
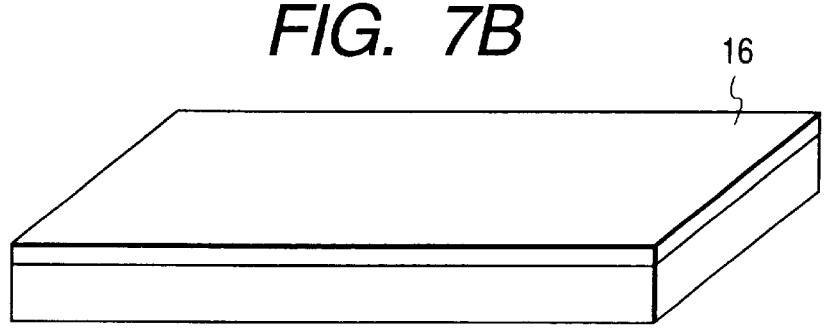
Figure 7C:
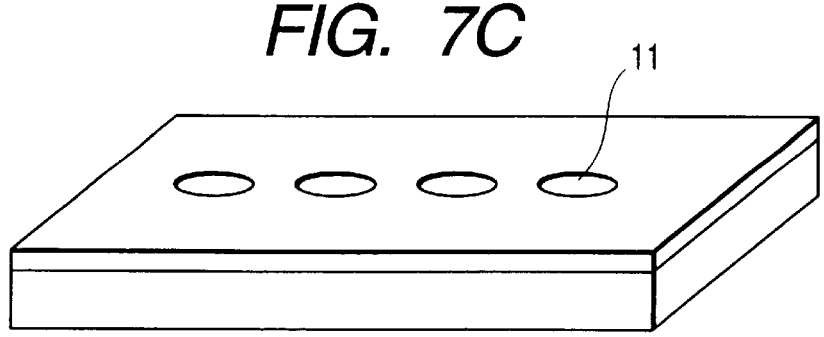
Figure 7D:
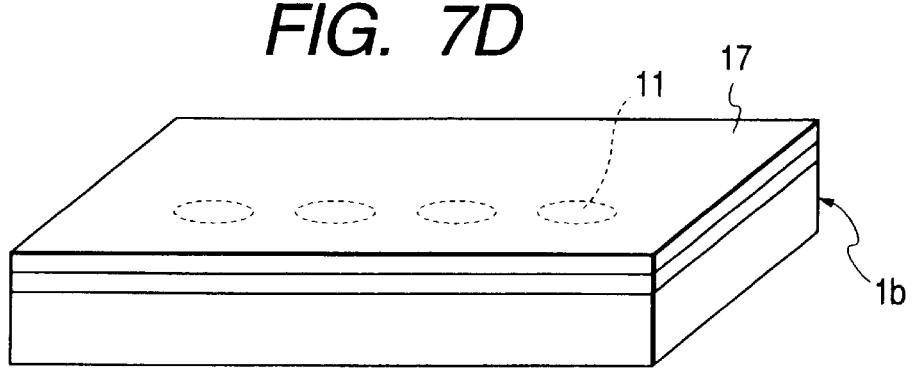

FIGS. 7A to 7D show the second type of mask plate. As shown in FIG. 7A, the quartz substrate 15, which is obtained by cutting a synthetic quartz plate to a predetermined size, is used as the base of the mask plate 1. As shown in FIG. 7B, by deposition or sputtering, the dielectric multilayer interference film mirror coating layer 16 is formed according to the wavelength of the ultraviolet laser beams emitted during discharge nozzle fabrication in the orifice plate on the side of the quartz substrate 15 which is brought into close contact with the orifice plate when discharge nozzles are manufactured in the orifice plate (the side opposite to the side on which ultraviolet laser beams are incident, or the upper surface in FIG. 7A). The total-reflection mirror coating layer 16 is provided with resist patterns, not shown, etching is performed by plasma emission to remove the thickness of the total-reflection mirror coating 16 and form patterns 11 corresponding to the shape of the discharge ports (FIG. 7C). Then the resist is removed, and an overcoating layer 17 is formed with an inorganic material which transmits ultraviolet rays, such as $SiO_2$, over the entire surface of the total-reflection mirror coating layer 16, including the etched surface to manufacture a mask plate 1b as shown in FIG. 7D.

Figure 8A:
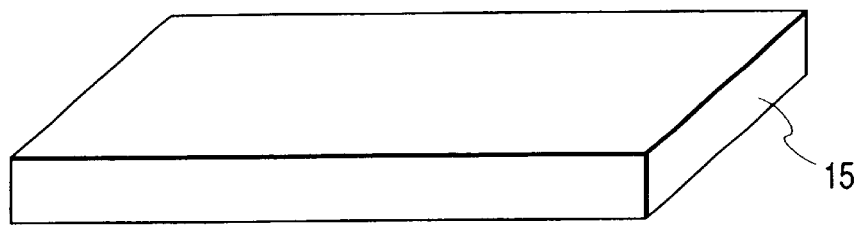
FIGS. 8A, 8B, 8C and 8D are schematic views illustrating a third process of producing a mask plate used for a method for manufacturing discharge nozzles of a liquid jet recording head of the present invention.
Figure 8B:
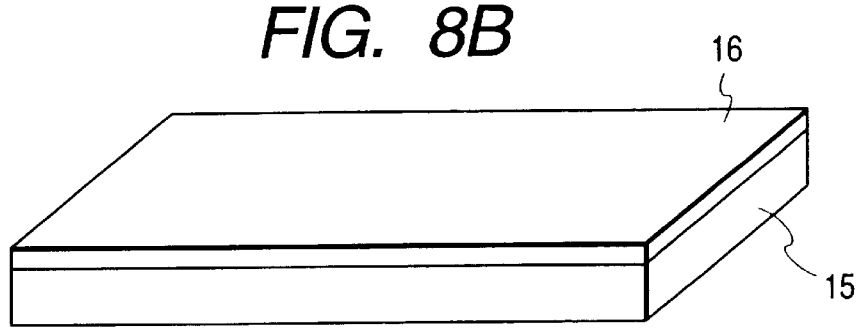
Figure 8C:
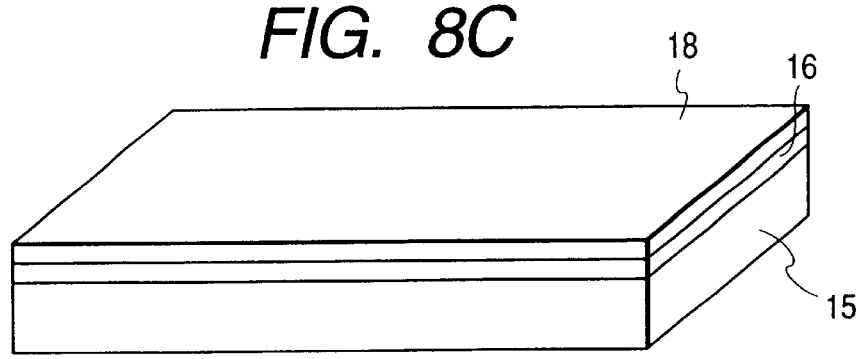
Figure 8D:
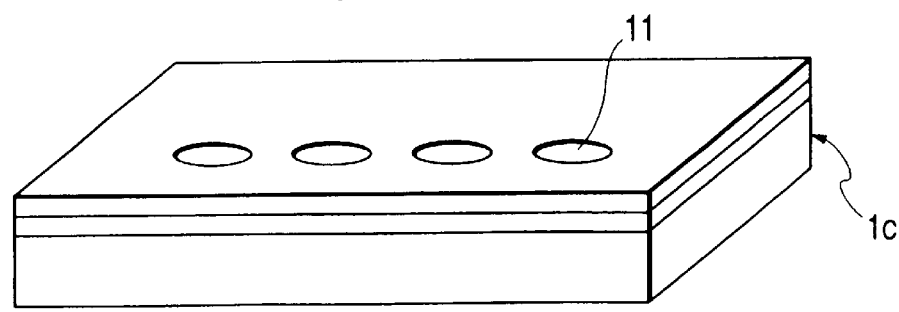

FIGS. 8A to 8D show the third type of mask plate. As shown in FIG. 8A, the quartz substrate 15, which is obtained by cutting a synthetic quartz plate to a predetermined size, is used as the base of the mask plate 1. As shown in FIG. 8B, by deposition or sputtering, the dielectric multilayer interference film mirror coating layer 16 is formed according to the wavelength of the ultraviolet laser beams emitted during discharge nozzle fabrication in the orifice plate on the side of the quartz substrate 15 which is brought into close contact with the orifice plate when discharge nozzles are manufactured in the orifice plate (the side opposite to the side on which the ultraviolet laser beams are incident, or the upper surface in FIG. 8A). An overcoating layer 18 is formed with an inorganic material which transmits ultraviolet rays, such as $SiO_2$, or an organic material over the entire surface of the total-reflection mirror coating layer 16 (FIG. 8C). Then the total-reflection mirror coating layer 16 and overcoating layer 18 are provided with resist patterns, not shown, etching is performed by plasma emission to remove the thickness of the total-reflection mirror coating 16 and overcoating layer 18 and form patterns 11 corresponding to the shape of the discharge ports (FIG. 8D). Finally, the resist is removed to manufacture a mask plate 1c as shown in FIG. 8D.

When discharge nozzles are manufactured using the mask plate 1a, 1b, or 1c, which is manufactured through the above-described manufacturing steps, and a laser, only part of an ultraviolet laser beam aimed at the mask plate that passes through the mask plate without reflecting the pattern 11 corresponding to the shape of the discharge ports is used for discharge nozzle fabrication, and most of the remaining laser beam is reflected. Thus the mask plate itself absorbs no laser beam, thus preventing expansion and deformation due to heat. That is, because the mask plate 1 does not deform, highly accurate discharge nozzles are manufactured, and the durability of the mask plate increases.

If the total-reflection mirror coating layer 16 is relatively thin, it may be damaged by plasma when the orifice plate is manufactured. This problem is solved by using a mask plate manufactured by providing the total-reflection mirror coating layer 16 with the overcoating layer 17 or 18, that is; the second mask plate 1b or third mask plate 1c.

When discharge nozzles are manufactured in the orifice plate 2 using the mask plate 1 as described above, the parallel ultraviolet laser beams A, B, C, and D are simultaneously directed at the mask plate 1, which is in close contact with the orifice plate 2 jointed to the liquid jet recording head body 3, and the mask plate 1 and orifice plate 2 are moved back and forth with respect to the area at which the laser beams are aimed. By doing so, manufacturing is done in the direction of the thickness of the mask plate 2, that is; the direction of laser beam travel under the action of sublimation to form a plurality of discharge nozzles of the same shape which are tapered so that they are progressively thinner in the direction of liquid discharge (i.e., toward the mask plate side).

Figure 5:
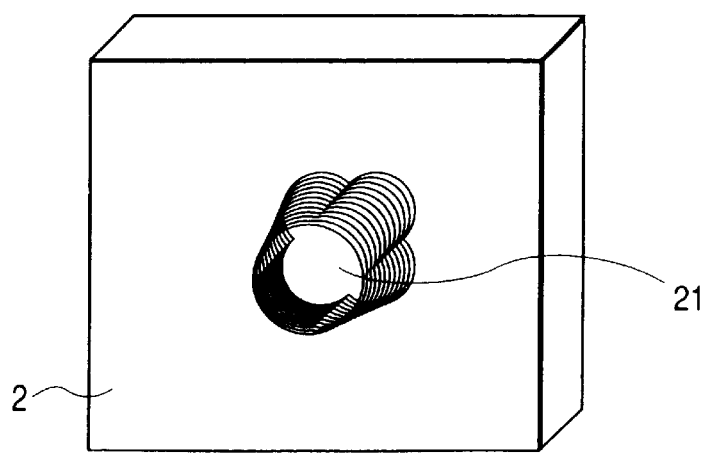
FIG. 5 is a perspective view of a discharge nozzle formed by a method for manufacturing discharge nozzles of a liquid jet recording head of the present invention.

Such fabrication is done by emitting four laser beams in the directions symmetric about the x axis as shown in FIG. 5. Thus the resulting discharge nozzles 21 do not have a frusto-conical shape symmetric about an axis, but have a conical shape on the side of liquid discharge and a substantially rectangular shape formed by four radially overlapped circles on the side of liquid feed. The discharge nozzles also gradually change in shape from a circle to a substantial rectangle in the direction of the thickness of the orifice plate 2.

Figure 4A:
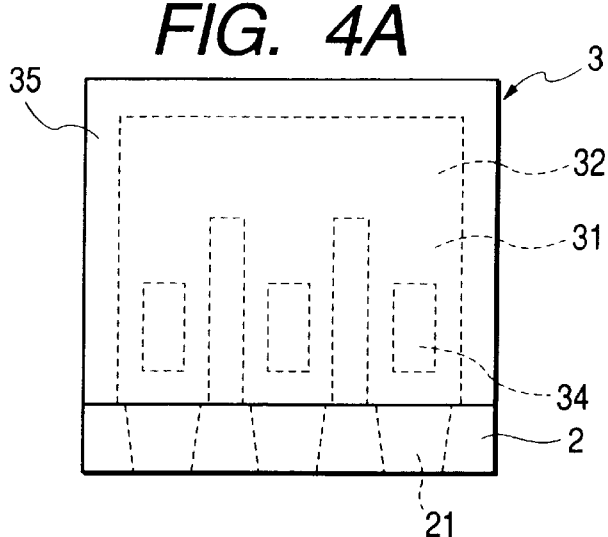
FIGS. 4A, 4B and 4C are schematic views of a liquid jet recording head manufactured by a method for manufacturing a liquid jet recording head of the present invention.
Figure 4B:
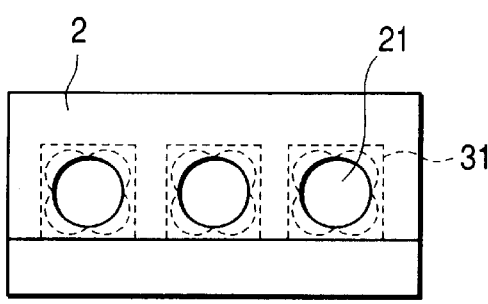
Figure 4C:
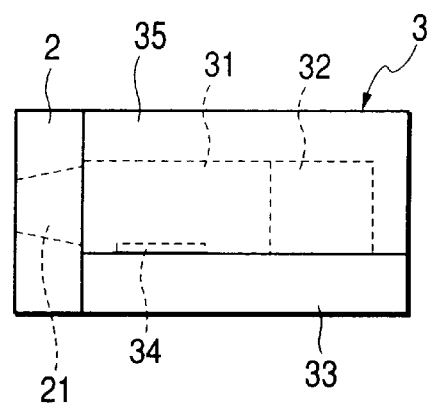

Referring now to FIGS. 4A to 4C, a liquid jet recording head to which the above-described method for manufacturing discharge nozzles applies will be described below.

In FIGS. 4A to 4C, reference numeral 33 denotes a substrate. Liquid discharge pressure generating elements 34, such as electricity-heat conversion elements, electric energy-mechanical energy conversion elements or the like, for discharging recording liquid, are disposed on the substrate 33. The liquid discharge pressure generating elements 34 are positioned in a liquid path 31 communicating with the discharge nozzles 21, each of which communicates with a common liquid chamber 32. The common liquid chamber 32 is connected with a liquid feed pipe (not shown), through which recording liquid is fed from a recording liquid tank. Reference numeral 35 denotes a ceiling which has a recess for manufacturing the liquid path 31 and the common liquid chamber 32. The ceiling 35 is connected with the substrate 33, thus configuring the liquid jet recording head body 3 which forms the liquid path 31 and common liquid chamber 32. The orifice plate 2 with the discharge nozzles 21 is provided on the liquid path end side of the liquid jet recording head body 3. The array of discharge nozzles 21 formed in the orifice plate 2 is one-dimensional. A plurality of discharge nozzles or a plurality of rows of a plurality of discharge nozzles can be arrayed as appropriate.

Such a liquid jet recording head can be manufactured as described below. A heater 34, that is, a heat generating resistor which generates thermal energy used for liquid discharge from the discharge nozzles; integrated circuits, such as shift registers, not shown; and wiring are patterned on a silicon substrate to manufacture the substrate 33. The recess, which provides the liquid path 31 and common liquid chamber 32, and a liquid feed port, not shown, are formed on the silicon plate by chemical etching to manufacture the ceiling 35. Then the liquid jet recording head body 3 is formed by aligning and connecting the substrate 33 and the ceiling 35 so that the recess, providing the liquid discharge side end and the liquid path 31, corresponds to the array of heaters 34. The orifice plate 2, in which no discharge nozzles are formed, is bonded to the liquid discharge side end of the liquid jet recording head body 3. The discharge nozzles 21 are manufactured by the above-described method for manufacturing discharge nozzles, and an electrical board patterned with heater drive terminals, which are not shown, and an aluminum base plate are jointed to the substrate 33. Finally, a holder holding members and a recording liquid tank for feeding recording liquid are jointed to the substrate to assemble the liquid jet recording head.

A structure into which the ceiling 35 on the one hand, in which the recess, providing the liquid path 31 and the common liquid chamber 32, and the liquid feed port are formed and the orifice plate 2 on the other hand, in which no discharge nozzles are formed, are integrated by injection molding using a resin, such as polysulfone or the like, is aligned and connected with the substrate 33, mounted with integrated circuit silicon chips patterned with the heaters 34 and the like. Then the discharge nozzles 21 are formed by the above-described method for manufacturing discharge nozzles, and an electrical board patterned with heater drive terminals, which are not shown, and an aluminum base plate are jointed to the substrate 33. Finally, a holder holding members and a recording liquid tank for feeding recording liquid are jointed to the substrate to assemble the liquid jet recording head.

As described above, no matter what structure the liquid jet recording head may have, discharge nozzles of the present invention can be formed after an orifice plate in which discharge nozzles are formed is jointed to a member which supports the orifice plate. The liquid jet recording head that is manufactured in this way can prevent an array of discharge nozzles from deforming and a recording liquid discharge direction from varying due to discharge nozzle deformation in different directions as an orifice plate is strained when it is jointed to its supporting member.

Both because the discharge nozzles 21 manufactured in the orifice plate 2 as described above are substantially rectangular on the liquid feed side and because the cross section of the liquid path 31 in the direction of liquid flow is rectangular, the discharge nozzles 21 are manufactured by laser beams so that the nozzles and liquid path have the same shape. Thus the discharge nozzles smoothly connect to the liquid path, so that recording liquid flow resistance decreases, resulting in increased recording liquid projection speed and printing speed.

Figure 9:
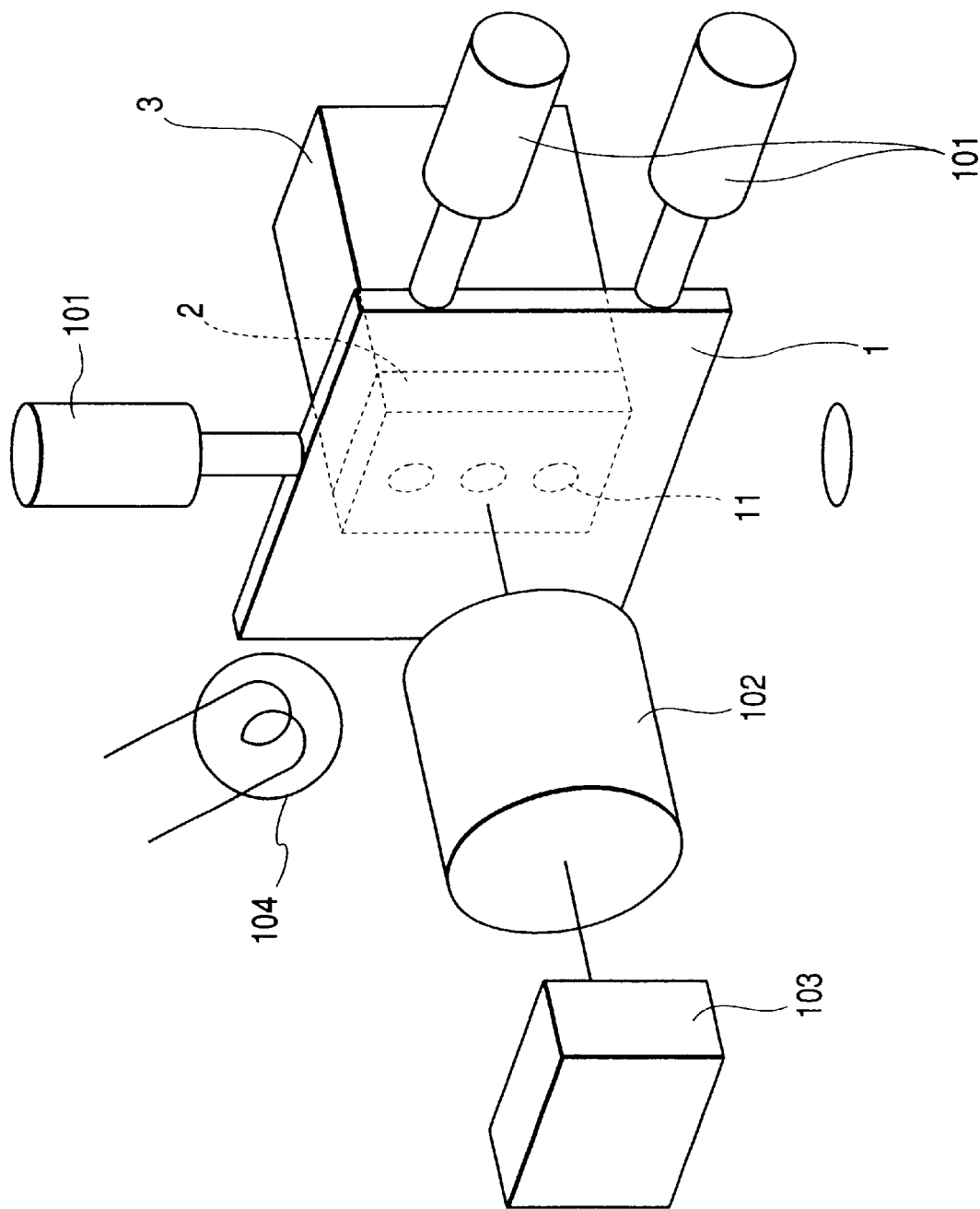
FIG. 9 is a schematic view illustrating a mask plate pattern used for a method for manufacturing discharge nozzles of a liquid jet recording head of the present invention.

In an embodiment of the present invention, a 50-$\mu$m-thick orifice plate made of polysulfone is bonded to a liquid jet recording head body, a mask plate 1 on which 300 discharge port patterns which have a reflectance of 98% or more and are 20 $\mu$m in diameter are arrayed at a density of 600 dpi is brought into close contact with the orifice plate, and four parallel laser beams with a power density of 1 J/cm$^2$ are aimed at the mask plate 1. The mask plate 1 and orifice plate 2, which are in close contact with each other, and liquid jet recording head body 3 are moved back and forth twice with respect to the laser beams at the beginning and end of fabrication to fabricate discharge nozzles. The laser beams are adapted so that they are inclined 15° to the direction of liquid discharge. Fifty liquid jet recording heads were manufactured in such a way. Observation of the shape of the discharge nozzles of these liquid jet recording heads showed that the nozzles are tapered so that they are progressively thinner toward the end of liquid discharge and that nozzle shape variations were much smaller, compared with conventional liquid jet recording heads. When printing is performed using a liquid jet recording head manufactured in such a way, an extremely reduced amount of mist occurred, thus resulting in regularly circular ink dots and a high-quality image. Referring now to FIG. 9, below is described how to align a mask plate with an orifice plate when a method for manufacturing discharge nozzles according to the present invention is employed.

The mask plate 1 and orifice plate 2, which are combined with the liquid jet recording head body 3, are stacked one on top of the other in a place other than where discharge nozzles are formed as described above, and the patterns 11 on the mask plate 1 are aligned with the liquid path 31 in the liquid jet recording head body 3 (see FIGS. 4A to 4C). Using an imaging element 102, such as a CCD, the liquid path 31 in the liquid jet recording head body 3 is observed in the light of a black-body radiation lamp 104 through a projection lens 1, with the mask plate 1 in close contact with the orifice plate 2. Because the mask plate 1 consists of a transparent quartz substrate coated with a dielectric multilayer interference film matched to the wavelength of ultraviolet laser beams to be emitted, the mask plate remains transparent at wavelengths other than that of the ultraviolet laser beams as described above using FIGS. 6A to 6C. In addition, because the orifice plate 2 is made of a resin which is almost transparent in visible light (in the embodiment, polysulfone), the liquid path 31 in the liquid jet recording head body 3 can be observed from outside the mask plate 1, using visible light. The patterns 11 on the mask plate 1 are observed, with the focus of the projection lens 102 slightly shifted. Because the patterns 11 are on the side of the orifice plate, visible light which transmits the mask plate 1, consisting of a transparent quartz substrate, is used to observe the patterns. The liquid path 31 is checked for position by observing both the patterns 11 and the liquid path 31. Then an actuator 101 is driven to adjust the position of the mask plate 1 so that the patterns 11 are properly positioned with respect to the liquid path. After the mask plate 1 is moved to a proper position, the mask plate 1 and liquid jet recording head body 3 are secured using a gripper, not shown, so that the plate and body do not move with respect to each other. The liquid jet recording head body 3, including the mask plate 1 and orifice plate 2 which are secured with the liquid path 31 in the liquid jet recording head body 3 on the one hand and the patterns 11 on the mask plate 1 on the other hand aligned, is moved for laser manufacturing to a predetermined position where discharge nozzles are manufactured using a laser. These operations make it possible to significantly increase discharge nozzle positional accuracy.

Because the overcoat layer 17 on the mask plate described using FIGS. 7A to 7D and 8A to 8D is also made of $SiO_2$, which transmits visible light, the method of alignment illustrated using FIG. 9 can be advantageously used for the overcoat layer.

As described above, the present invention allows a mask plate to be prevented from going beyond its endurance limit and being damaged. It also allows a high tolerance to be provided because a mask plate does not expand or deform due to heat.

In addition, the present invention allows the patterns on a mask plate, which is brought into close contact with a discharge port forming plate, to be aligned efficiently and easily. Thus laser manufacturing can be performed with high accuracy using plates in close contact with each other, so that positional accuracy of a discharge nozzle at the time of fabrication is heightened.

Moreover, according to the present invention, discharge nozzles can be formed which are symmetric about the direction of liquid discharge and tapered so that they are progressively thinner toward the side of liquid discharge and have an opening in the same diameter on the side of liquid discharge. This, in turn, means that an array of many discharge nozzles can be manufactured at a time in a short time.

Furthermore, because discharge nozzles can be formed in the last step after a liquid jet recording head is assembled, liquid is prevented from being ejected in different directions due to deformation caused by assembly and joint of a discharge port forming plate, and discharge nozzles are formed on the liquid ejection side of the discharge nozzle forming plate so that they are progressively thinner toward their ends. Thus liquid drops are ejected in the same direction, and liquid drop projection increases, thus significantly enhancing quality of printing by a liquid jet recording head and making high-speed printing possible.

What is claimed is:

1. A method for manufacturing discharge nozzles of a liquid jet recording head which brings a mask plate patterned with a shape of a discharge port to be formed, into close contact with a liquid jet side of a discharge port forming plate of the liquid jet recording head and emits a laser beam from the side of the mask plate to fabricate the discharge nozzles on the discharge port forming plate, wherein the mask plate has a quartz substrate and a total-reflection mirror coating layer which is provided in the areas outside the shape of the discharge nozzles on the substrate and the substrate is disposed on the side on which the laser beam is incident.

2. A method for manufacturing discharge nozzles of a liquid jet recording head which brings a mask plate patterned with a shape of a discharge port to be formed, into close contact with a liquid ejection side of a discharge port forming plate of the liquid jet recording head and emits an ultraviolet laser beam from the side of the mask plate to fabricate the discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and after the total-reflection mirror coating layer is removed according to the shape of the discharge ports, the total-reflection mirror coating layer is overcoated with an inorganic material which transmits ultraviolet rays.

3. A method for manufacturing discharge nozzles of a liquid jet recording head which brings a mask plate patterned with a shape of a discharge port to be formed, into close contact with a liquid ejection side of a discharge port forming plate of the liquid jet recording head and emits an ultraviolet laser beam from the side of the mask plate to fabricate the discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and after the total-reflection mirror coating layer is overcoated according to the shape of the discharge ports, the total-reflection mirror coating layer and the overcoating layer are removed according to the shape of the discharge nozzles.

4. The method for manufacturing discharge nozzles of a liquid jet recording head according to any of claims 1–3, wherein the total-reflection mirror coating layer is a dielectric multilayer interference film formed according to the wavelength of laser beams by deposition or sputtering.

5. The method for manufacturing discharge nozzles of a liquid jet recording head according to any of claims 1–3, wherein the substrate is made of transparent quartz and wherein the predetermined positions of discharge ports to be formed in the discharge nozzle forming plate are aligned with the positions of patterns on the mask plate by observation in visible light.

6. The method for manufacturing discharge nozzles of a liquid jet recording head according to claim 5, wherein the discharge port forming plate is made of a resin which is transparent under visible light, wherein the patterns on the mask plate are observed in visible light passing through the mask plate, and wherein a liquid path behind the discharge port forming plate is observed in visible light passing through the discharge nozzle forming plate.

7. A method for manufacturing a liquid jet recording head, which brings a mask plate, patterned with the shape of discharge ports to be formed, into close contact with the liquid ejection side of a discharge port forming plate of the liquid jet recording head and emits a laser beam from the side of the mask plate to fabricate discharge nozzles on the discharge port forming plate, wherein the mask plate has a quartz substrate and a total-reflection mirror coating layer which is provided in the areas outside the shape of the discharge ports on the substrate and wherein the substrate is disposed on the side on which the laser beam is incident.

8. A method for manufacturing a liquid jet recording head which brings a mask plate, patterned with the shape of discharge ports to be formed, into close contact with the liquid ejection side of a discharge port forming plate of the liquid jet recording head and emits an ultraviolet laser beam from the side of the mask plate to fabricate discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and wherein after the total-reflection mirror coating layer is removed according to the shape of the discharge ports, the total-reflection mirror coating layer is overcoated with an inorganic material which transmits ultraviolet rays.

9. A method for manufacturing a liquid jet recording head which brings a mask plate, patterned with the shape of discharge ports to be formed, into close contact with the liquid ejection side of a discharge port forming plate of the liquid jet recording head and emits an ultraviolet laser beam from the side of the mask plate to fabricate discharge nozzles on the discharge port forming plate, wherein the mask plate, whose substrate is made of quartz, is given a total-reflection mirror coating matched to the wavelength of the ultraviolet laser beam opposite to the surface of the quartz substrate on which the ultraviolet laser beam is incident and wherein after the total-reflection mirror coating layer is overcoated, the total-reflection mirror coating layer and the overcoating layer are removed according to the shape of the discharge ports.

10. The method for manufacturing a liquid jet recording head according to any one of claims 7, 8, or 9, wherein the total-reflection mirror coating layer is a dielectric multilayer interference film formed according to the wavelength of laser beams by deposition or sputtering.

11. The method for manufacturing a liquid jet recording head according to any one of claims 7, 8, or 9, wherein the substrate is made of transparent quartz and wherein the predetermined positions of discharge ports to be manufactured in the discharge nozzle forming plate are aligned with the positions of patterns on the mask plate by observation in visible light.

12. The method for manufacturing a liquid jet recording head according to claim 11, wherein the discharge port forming plate is made of a resin which is transparent under visible light, wherein the patterns on the mask plate are observed in visible light passing through the mask plate, and wherein a liquid path behind the discharge port forming plate is observed in visible light passing through the discharge port forming plate.

13. The method for manufacturing a liquid jet recording head according to any one of claims 7, 8, or 9, wherein a heat generating element is provided which generates thermal energy used for ejecting liquid through the discharge nozzles.

* * * * *

UNITED STATES PATENT AND TRADEMARK OFFICE
CERTIFICATE OF CORRECTION

PATENT NO. : 6,426,481 B1
DATED : July 30, 2002
INVENTOR(S) : Jun Koide et al.

It is certified that error appears in the above-identified patent and that said Letters Patent is hereby corrected as shown below:

Column 2,
Line 4, "at" should be deleted.

Column 3,
Line 26, "head" should read -- head, which --;
Lines 39 and 51, "head and" should read -- head, and which --; and
Line 58, "incident and" should read -- incident, and, --.

Column 4,
Lines 1 and 33, "head and" should read -- head, and which --;
Line 8, "incident and" should read -- incident, and, --;
Line 38, "substrate and" should read -- substrate, and --;
Lines 45 and 62, "head and" should read -- head, and which --;
Line 51, "incident and wherein" should read -- incident, and wherein, --; and
Line 59, "discharge-" should read -- discharge --.

Column 5,
Line 1, "incident and wherein" should read -- incident, and wherein, --.

Column 9,
Line 66, "When" should read -- ¶When --.

Column 10,
Line 3, "Referring" should read -- ¶Referring --; and
Line 27, "The" should read -- ¶The --.

Column 12,
Line 64, "or" should read -- and --.

Column 13,
Line 2, "or" should read -- and --.

UNITED STATES PATENT AND TRADEMARK OFFICE
CERTIFICATE OF CORRECTION

PATENT NO. : 6,426,481 B1
DATED : July 30, 2002
INVENTOR(S) : Jun Koide et al.

It is certified that error appears in the above-identified patent and that said Letters Patent is hereby corrected as shown below:

Column 14,
Line 6, "or" should read -- and --.

Signed and Sealed this

Twenty-second Day of April, 2003

JAMES E. ROGAN
*Director of the United States Patent and Trademark Office*